United States Patent
Carranza et al.

(10) Patent No.: US 11,157,384 B2
(45) Date of Patent: Oct. 26, 2021

(54) METHODS, SYSTEMS, ARTICLES OF MANUFACTURE AND APPARATUS FOR CODE REVIEW ASSISTANCE FOR DYNAMICALLY TYPED LANGUAGES

(71) Applicant: Intel Corporation, Santa Clara, CA (US)

(72) Inventors: Marcos Carranza, Portland, OR (US); Mats Agerstam, Portland, OR (US); Justin Gottschlich, Santa Clara, CA (US); Alexander Heinecke, San Jose, CA (US); Cesar Martinez-Spessot, Cordoba (AR); Maria Ramirez Loaiza, Beaverton, OR (US); Mohammad Mejbah Ul Alam, Milpitas, CA (US); Shengtian Zhou, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/455,358

(22) Filed: Jun. 27, 2019

(65) Prior Publication Data
US 2019/0324727 A1    Oct. 24, 2019

(51) Int. Cl.
*G06F 11/36*   (2006.01)
*G06F 8/41*    (2018.01)

(52) U.S. Cl.
CPC .......... *G06F 11/3604* (2013.01); *G06F 8/437* (2013.01)

(58) Field of Classification Search
None
See application file for complete search history.

(56) References Cited

U.S. PATENT DOCUMENTS

2006/0247798 A1*  11/2006  Subbu ............... G06N 3/126
                                                 700/44
2009/0138898 A1*  5/2009   Grechanik ............ G06F 8/20
                                                 719/328

(Continued)

OTHER PUBLICATIONS

McIntosh et al., "The Impact of Code Review Coverage and Code Review Participation on Software Quality," The 11th Working Conference on Mining Software Repositories (MSR 2014), Jun. 2014, pp. 192-201, 11 pages.

(Continued)

*Primary Examiner* — Qing Chen
(74) *Attorney, Agent, or Firm* — Hanley, Flight & Zimmerman, LLC

(57) ABSTRACT

Methods, apparatus, systems and articles of manufacture are disclosed for code review assistance for dynamically typed languages. An example apparatus to analyze a segment of code includes a function identifier to identify a first input of a first function call included in the segment of the code, a parameter type vector (PTV) estimator model to estimate a first data structure based on the first input, the PTV estimator model generated via a set of reviewed code, a PTV determiner to generate a second data structure based on a data parameter type of the first input, an error comparator to determine a first reconstruction error based on the first data structure, and the second data structure and a recommendation generator to, if the first reconstruction error does not satisfy a recommendation threshold, generate a first recommendation to review the first function call.

26 Claims, 7 Drawing Sheets

(56) References Cited

U.S. PATENT DOCUMENTS

| | | | | |
|---|---|---|---|---|
| 2010/0299305 | A1* | 11/2010 | Laxman | G06F 8/71 707/609 |
| 2011/0041120 | A1* | 2/2011 | Nagappan | G06F 8/77 717/126 |
| 2013/0054669 | A1* | 2/2013 | Nachreiner | G06F 9/547 709/201 |
| 2013/0080996 | A1* | 3/2013 | Allam | G06F 9/5066 717/120 |
| 2014/0053135 | A1* | 2/2014 | Bird | G06F 11/008 717/124 |
| 2014/0196010 | A1* | 7/2014 | Balachandran | G06F 8/70 717/124 |
| 2015/0319185 | A1* | 11/2015 | Kirti | H04L 67/306 726/23 |
| 2016/0004627 | A1* | 1/2016 | Farchi | G06F 11/3616 717/127 |
| 2016/0299838 | A1* | 10/2016 | Farchi | G06N 20/00 |
| 2017/0212829 | A1* | 7/2017 | Bales | G06F 11/3612 |
| 2018/0046912 | A1* | 2/2018 | Kurata | G06N 3/0454 |
| 2018/0129959 | A1* | 5/2018 | Gustafson | G06N 20/00 |
| 2018/0137424 | A1* | 5/2018 | Gabaldon Royval | G06N 5/022 |
| 2018/0144241 | A1* | 5/2018 | Liu | G06N 3/0454 |
| 2019/0228319 | A1* | 7/2019 | Gupta | G06F 8/30 |
| 2020/0004532 | A1* | 1/2020 | Sobran | G06N 5/04 |

OTHER PUBLICATIONS

Fagan, "Design and Code Inspections to Reduce Errors in Program Development," IBM Systems Journal, 15(3), pp. 182-211, 1976, 30 pages.

Bacchelli et al., "Expectations, Outcomes, and Challenges of Modern Code Review," 2013 International Conference on Software Engineering (ICSE'13), San Francisco, May 2013, pp. 712-721, 10 pages.

Thongtanunam et al., "Who Should Review my Code? A File Location-Based Code-Reviewer Recommendation Approach for Modern Code Review," 2015 IEEE 22nd International Conference on Software Analysis, Evolution, and Reengineering, 10 pages.

python.org, "Errors and Exceptions," Retrieved from [https://docs.python.org/2/tutorial/errors.html] on Jul. 23, 2019, 7 pages.

Andrews et al., "General Test Result Checking with Log File Analysis," IEEE Transactions on Software Engineering, vol. 29, No. 7, pp. 634-648, Jul. 2003, 634-648 pp, 15 pages.

European Patent Office, "Extended European Search Report," dated Oct. 29, 2020 in connection with European Patent Application No. 20166239.2, 8 pages.

Hellendoorn et al., "Deep Learning Type Inference," ESEC/FSE '18, Nov. 4-9, 2018, Lake Buena Vista, FL, 11 pages.

Furr et al., "Static Type Inference for Ruby," SAC '09, Mar. 8-12, 2009, Honolulu, HI, 8 pages.

Malik et al., "NL2Type: Inferring JavaScript Function Types from Natural Language Information," IEEE/ACM 41st International Conference on Software Engineering (ICSE), May 25-31, 2019, Montreal, CA, 12 pages.

Gottschlich et al., "The Thee Pillars of Machine Programming," Intel Labs, MIT, May 8, 2018, 11 pages.

* cited by examiner

METHODS, SYSTEMS, ARTICLES OF MANUFACTURE AND APPARATUS FOR CODE REVIEW ASSISTANCE FOR DYNAMICALLY TYPED LANGUAGES

FIELD OF THE DISCLOSURE

This disclosure relates generally to code review technology, and, more particularly, to methods, systems, articles of manufacture, and apparatus for code review assistance for dynamically typed languages.

BACKGROUND

Statically typed languages (e.g., C, C+, Java, Fortran, etc.) check the type of variables (e.g., float, integer, string, etc.) while the code is compiling. Dynamically typed languages (e.g., Python, JavaScript, Ruby, Perl, etc.) do not require compiling and the types of variables used in these languages are checked at code run-time. Accordingly, errors in scripts written with dynamically typed languages are often discovered during run-time.

Code review ensures software quality by allowing multiple programmers to check software by viewing and editing source code. Source code is often uploaded to an online repository, such as Github. After source code has been uploaded, reviewers are able to look for and correct errors in the source code. A thorough and iterative code review process can help ensure quality software.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
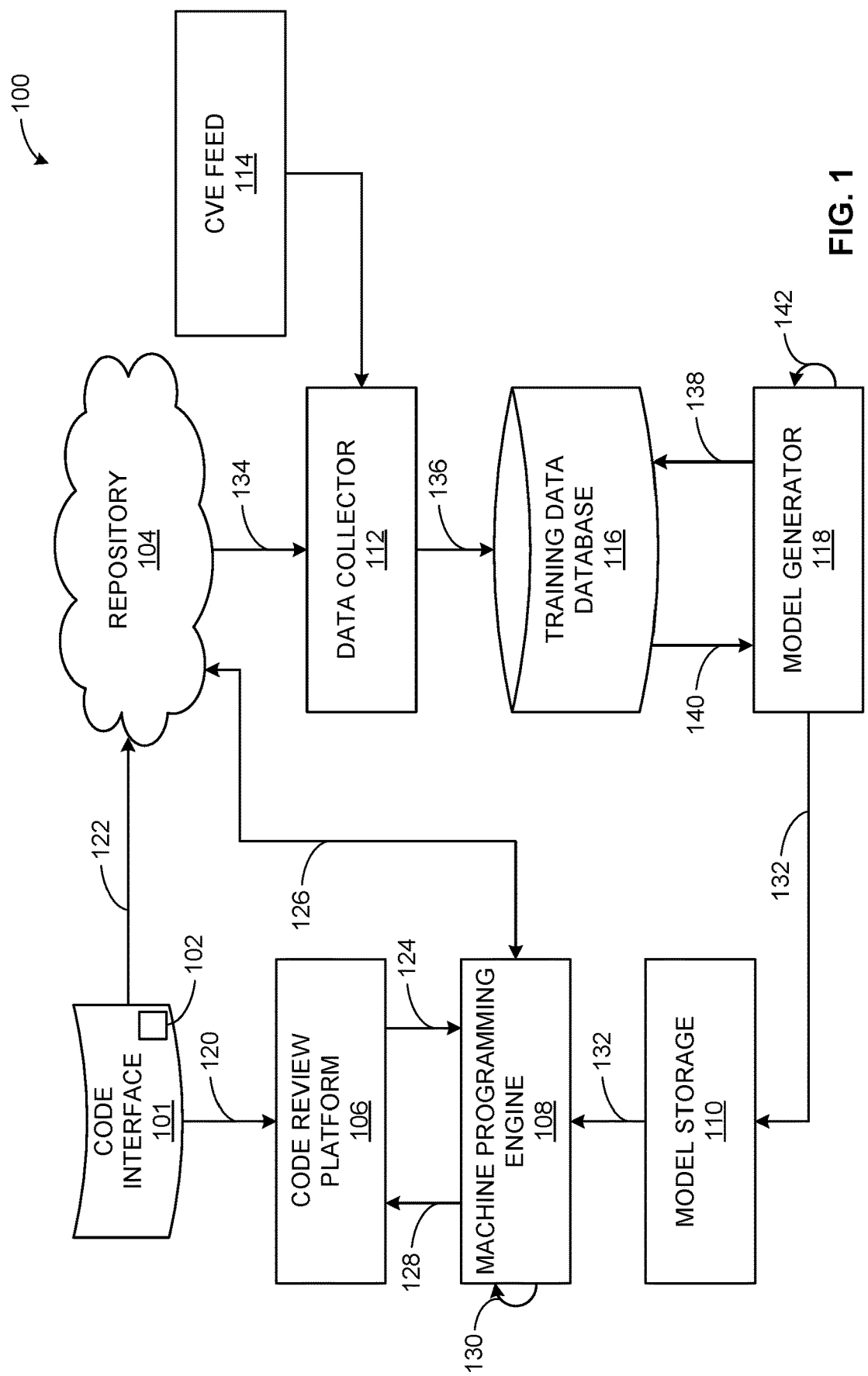
FIG. 1 is an illustration of a code review system constructed in accordance with the teachings of this disclosure.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Throughout the specification and claims, the following terms take the meanings explicitly associated herein unless the context clearly dictates otherwise. The term "neural network" refers to a computing system or other processor system that learns to perform a task by analyzing pre-classified training examples. Neural networks include a plurality of densely connected processing nodes inspired by the human brain. In certain examples, the nodes of neural networks can be organized into layers in which data moves in the forward direction (e.g., data in the first layer moves into the second layer, data in the second layer moves into the third layer, etc.), for example, to drive one or more outputs based on one or more inputs via correlations (e.g., connections) represented by the nodes and their interconnections. Deep learning and/or machine learning can be implemented via a neural network to process incoming data to generate an output and benefit from feedback to improve its processing. A "recurrent neural network" or "RNN" is a type of neural network in which nodes or cells include loops to allow information to persist over time. Thus, the RNN can leverage reasoning about previous events to inform subsequent processing. In an RNN, a memory or other internal state is used to process input sequence(s) in an element-by-element process wherein an output for each element is dependent on the output of previous and/or other elements (e.g., a directed graph driving a sequence).

Many different types of machine learning models and/or machine learning architectures exist. In examples disclosed herein, a "long short-term memory" network is used. However, other types of machine learning models could additionally or alternatively be used such as, for example, a support vector machine (SVM), a different type of RNN, a convolutional neural network (CNN), etc. "Long short-term memory" networks or "LSTM" networks are RNNs designed to handle long-term dependencies. Generally, LSTM networks are organized into cells and gates which interact to optimize the output of the network. Information from outside the processing of the current element (e.g., information from previous elements) is stored in gated cells. These gates release information based on the weight of the gates, which are adjusted and optimized during the training phase of the AI. In an LSTM network (or its pared-down variant gated recurrent unit network), the nodes or cells in the network have storage and an associated stored state under control of the neural network to aid in establishing correlations and processing input data. An "encoder-decoder LSTM" is a type of LSTM that is comprised of two RNN models, an encoder model and a decoder model. Generally, the encoder model reads an input and encodes it into a fixed length vector. The decoder model maps the fixed length vector into a variable length output. A common application of encoder-decoder LSTM networks is text translation.

Different types of training may be performed based on the type of machine learning model and/or the expected output. For example, supervised training uses inputs and corresponding expected (e.g., labeled) outputs to select parameters (e.g., by iterating over combinations of select parameters) for the machine learning model that reduce model error. Unsupervised learning refers to an expected output of the machine learning model (e.g., a classification, an expected output value, etc.) being assumed from unlabeled input data by the neural network. Additionally or alternatively, unsupervised training (e.g., used in deep learning, a subset of machine learning, etc.) involves inferring patterns from inputs to select parameters for the machine learning model (e.g., without the benefit of expected (e.g., labeled) outputs). Some examples disclosed herein include models that are trained via supervised training. However, any other type of training/learning can be used.

Dynamically typed languages are rapidly gaining popularity. Traditional code review methods of dynamically typed languages often require a significant time investment. For example, because code errors are discovered while the code is running, errors in the code are often discovered serially. That is, each error in the code is encountered one at a time. In such examples, if the code contains two or more errors (e.g., a first error, a second error, etc.), the first error would cause the code to crash and would require a programmer to fix it. After fixing the first error, the second error would cause the code to crash and require a similar fix from the programmer. As such, each error in a dynamically typed language must be discovered and fixed individually before the next error can be found. Accordingly, the review of code corresponding to dynamically typed languages can be time-consuming and inefficient.

Examples disclosed herein overcome the above obstacles and improve code review techniques by analyzing source code and providing review suggestions using a neural network tuned to process the function calls of code and generate review suggestions based on this analysis. Examples disclosed herein reduce the amount of iterative and serial review required to develop software code with dynamically typed languages by generating review recommendations for new code simultaneously. In some examples disclosed herein, the inputs of the function calls of a segment of code are determined and analyzed by a neural network (e.g., an encoder-decoder LSTM, etc.). In some examples disclosed herein, the neural network is generated and trained using previously checked and error-free code retrieved from a repository. In some examples disclosed herein, a neural network can generate a predicted data structure corresponding to the inputs of a function call. In such examples disclosed herein, the predicted data structure can be compared to the actual data structure associated with the function call. In such examples, the difference between the predicted data structure and the actual data structure can be compared to determine if there is an error associated with the function call.

FIG. 1 is an illustration of a code review system 100 constructed in accordance with the teachings of this disclosure. The example code review system 100 includes an example new code 102, an example repository 104, an example code review platform 106, an example machine programming engine 108, an example model storage 110, an example data collector 112, an example common vulnerable and exposures (CVE) feed 114, an example training database 116 and an example model generator 118.

The example new code interface 101 acquires, retrieves, and/or otherwise receives example new code 102 drafted by one or more programmers associated with the code review system 100. For example, one or more programmers associated with the code review systems 100 can manually input the new code 102 into the new code interface 101. In the illustrated example of FIG. 1, the new code 102 is written in a dynamically typed language (e.g., Python, JavaScript, Ruby, Perl, Matlab, etc.). In some examples, the new code 102 includes one or more function calls, each of which includes one or more inputs. In some examples, the function inputs are of a particular data type (e.g., integer, floating point, complex number, string, Boolean, mapping, set, etc.). In some examples, errors in the function input can be fatal. As used herein, the term "fatal" refers to a condition that causes the new code 102 obtained by the new code interface 101 to stop executing (e.g., exit, etc.) and, in some examples output (e.g., print, etc.) an error message. In some examples, the new code 102 obtained by the new code interface 101 can include one or more function calls including inputs with incorrectly assigned data types (e.g., a type error). As used herein, the term "type error" refers to an error that occurs when a function is applied to an input of an inappropriate type. In some examples, a type error can be fatal. Additionally or alternatively, a type error can cause the new code 102 obtained by the new code interface 101 to be unable to execute its intended function.

The example repository 104 is a file archive and hosting service where the obtained by the new code interface 101 transmits the new code 102 to be stored. In some examples, the repository 104 is an online hosted service (e.g., Github®, Assembla®, SourceForge®, etc.). In other examples, the repository 104 is a physical location connected to the code review platform 106 that can be accessed via a physical connection, an intranet, etc. In some examples, the repository 104 allows revision control, error tracking, and other code review related functionality.

The example code review platform 106 is a code review tool (e.g., Gerrit®, Crucible®, etc.) that allows multiple developers to simultaneously work on the new code 102. In some examples, the code review platform 106 assists in the review of new code 102 by checking for coding style, naming conventions, reviewing for errors, etc. In some examples, the code review platform 106 is a tool incorporated in the repository 104 and/or the new code interface 101. In other examples, the code review platform 106, the new code interface 101, and the repository 104 can be independent software.

The example machine programming engine 108 analyzes the new code 102 to determine if there are any potential errors (e.g., type errors, etc.) that need to be corrected. In some examples, the machine programming engine 108 analyzes each function call of the new code 102. For example, the machine programming engine 108 can determine a parameter type vector (PTV) for each function call based on the inputs of the function call. As used herein, the term "parameter type vector" and the acronym "PTV" refers to a data structure (e.g., a vector, etc.) that indicates the parameters types (e.g., integer, floating point number, etc.) of the inputs of a function. In such examples, the machine programming engine 108 can compare the determined PTV to a predicted PTV generated by a machine learning model trained on a set of reviewed code. In some examples, if the difference (e.g., a Euclidean distance, etc.) between the determined PTV and the predicted PTV satisfies an error threshold, the machine programming engine 108 can generate an error warning associated with the analyzed function call of the new code 102. The example machine programming engine 108 can also identify structural issues (e.g., code/logic separation of functional blocks, etc.), suggest design patterns (e.g., enforcing a singleton, etc.), detect system-wide errors (e.g., race conditions, deadlocks, etc.), detect security issues (e.g., via a model trained using the CVE feed 114, etc.) and/or recommend language features. In some examples, the machine programming engine 108 is incorporated into the code review platform 106 and/or the repository 104. In other examples, the machine programming engine 108 hosted on the web and/or a local computer.

The example model storage 110 is the location where the current model(s) utilized by the machine programming engine 108 are stored. In some examples, the model storage 110 is an online location (e.g., a drop box, etc.). In other examples, the model storage 110 can be implemented by physical storage (e.g., a hard drive, etc.). In the illustrated example of FIG. 1, the model(s) stored in the model storage 110 were transmitted to the model storage 110 by the model generator 118. In some examples, when an updated model is received or otherwise retrieved from the model storage 110, the previous iteration of the model is deleted. In other examples, the previous models are stored in model storage 110 after an updated model has been received.

The example data collector 112 retrieves model generator data from the repository 104 and/or CVE feed 114 for use by the model generator 118. For example, the data collector 112 can query the repository 104 for fully reviewed code (e.g., codes with no known errors, etc.) using a delta feed. In other examples, the data collector 112 can pull (e.g., on a periodic, on an aperiodic, or scheduled basis, etc.) fully reviewed code from the repository 104. In some examples, the data collector 112 can also query the CVE feed 114 for periodic updates on common vulnerabilities and exposures of the new code 102. In some examples, the data collector 112 can tag blocks of code, functions and/or classes for use by the model generator 118. For example, the data collector 112 can tag collected code based on the function of the collected code (e.g., using metadata from the repository 104, using analytics, etc.). In some examples, the data collector 112 can determine the time complexity and/or space complexity of collected code. In some examples, the data collector 112 can use batch analytics.

The CVE feed 114 is a data feed which includes a list of common vulnerabilities and exposures in code. In some examples, the CVE feed 114 is generated by a publicly available CVE system operated by a concerned entity (e.g., The MITRE Corporation®, a government agency, etc.). In such examples, the CVE feed 114 is composed of unique identifiers for publicly known vulnerabilities in software. In some examples, the CVE feed 114 is continuously updated as new vulnerabilities are discovered. In some examples, the data collector 112 stores the collected data in the example training database 116. In some examples, the data collector 112 can modify and normalize the data to be stored in the example training database 116.

The example model generator 118 trains a machine learning model using the data collected by the data collector 112. For example, the example model generator 118 trains a machine learning model (e.g., a PTV estimator model 210 of FIG. 2 as described in further detail below, etc.) based on the data contained within the training database 116. In such examples, the model generator 118 can divide the data of the training database 116 into training data (e.g., data used to shape the machine learning model, etc.) and verification data (e.g., data used to test the machine learning model). In some examples, the model generator 118 generates the model using hyperparameters (e.g., a learning rate, a number of layers to be used in the machine learning model, etc.). In some examples, the model generator 118 can generate a new machine learning model (e.g., retrain the existing model, etc.). The model generator 118 can retrain the model in response to additional training data becoming available in the training database 116, in response to a threshold amount of time elapsing since generation of a prior model, etc.

In operation, a developer of the new code 102 pushes (e.g., commits, etc.) the new code 102 from the new code interface 101 to the repository 104 via an example first message 122. In other examples, the code review platform 106 and/or the machine programming engine 108 can detect when the new code 102 is ready for review and query the new code interface 101 for the new code 102. When the example first message 122 is transmitted by the new code interface 101, an example code review request 120 is transmitted by the new code interface 101 to the code review platform 106. In some examples, the code review request 120 is generated by the new code interface 101 in response to the first message 122. In other examples, the developer manually creates the code review request 120. Upon receiving the new code 102, the code review platform 106 generates a review request 124 and transmits the review request 124 to the machine programming engine 108. The machine programming engine 108 will then transmit an example request 126 for the committed code and associated metadata (e.g., information identifying the new code 102, etc.) from the repository 104. The machine programming engine 108 then performs an example analysis 130 using an example model 132 transmitted from the model storage 110. In some examples, the analysis 130 determines what function calls of the new code 102 should be flagged for reviewed. An example implementation of the example analysis 130 is described in greater detail below in conjunction with FIGS. 4-6.

To train the model 132 used by the machine programming engine 108, the data collector 112 collects example reviewed code 134 from the repository 104. In other examples, the example reviewed code 134 can come from any other suitable source (e.g., a different repository, locally from the programmers, etc.). In the illustrated example of FIG. 1, the data collector 112 can also gather data from the CVE feed 114. In some examples, the data collector 112 can preprocess (e.g., normalize, clean, transform, enrich, etc.) the reviewed code 134 to facilitate the training of the model. In other examples, the model generator 118 can preprocess the reviewed code 134. In the illustrated example of FIG. 1, the data collector 112 can transmit the preprocessed code 136 to the training database 116. After some period of time (e.g., periodically, aperiodically, scheduled, after a threshold period of time, after an error rate of the current model is exceeded, etc.), the example model generator 118 transmits a query 138 to the training database 116 for model generation data 140. In some examples, the model generation data 140 is divided into training data and verification data for use during example model generation 142. Once the example model generation 142 has concluded, the example model 132 is transmitted to the model storage 110 until the model 132 is requested by the machine programming engine 108. In some examples, the model 132 can be pushed to the machine programming engine 108 as soon as it is generated by the model generator 118.

Figure 2:
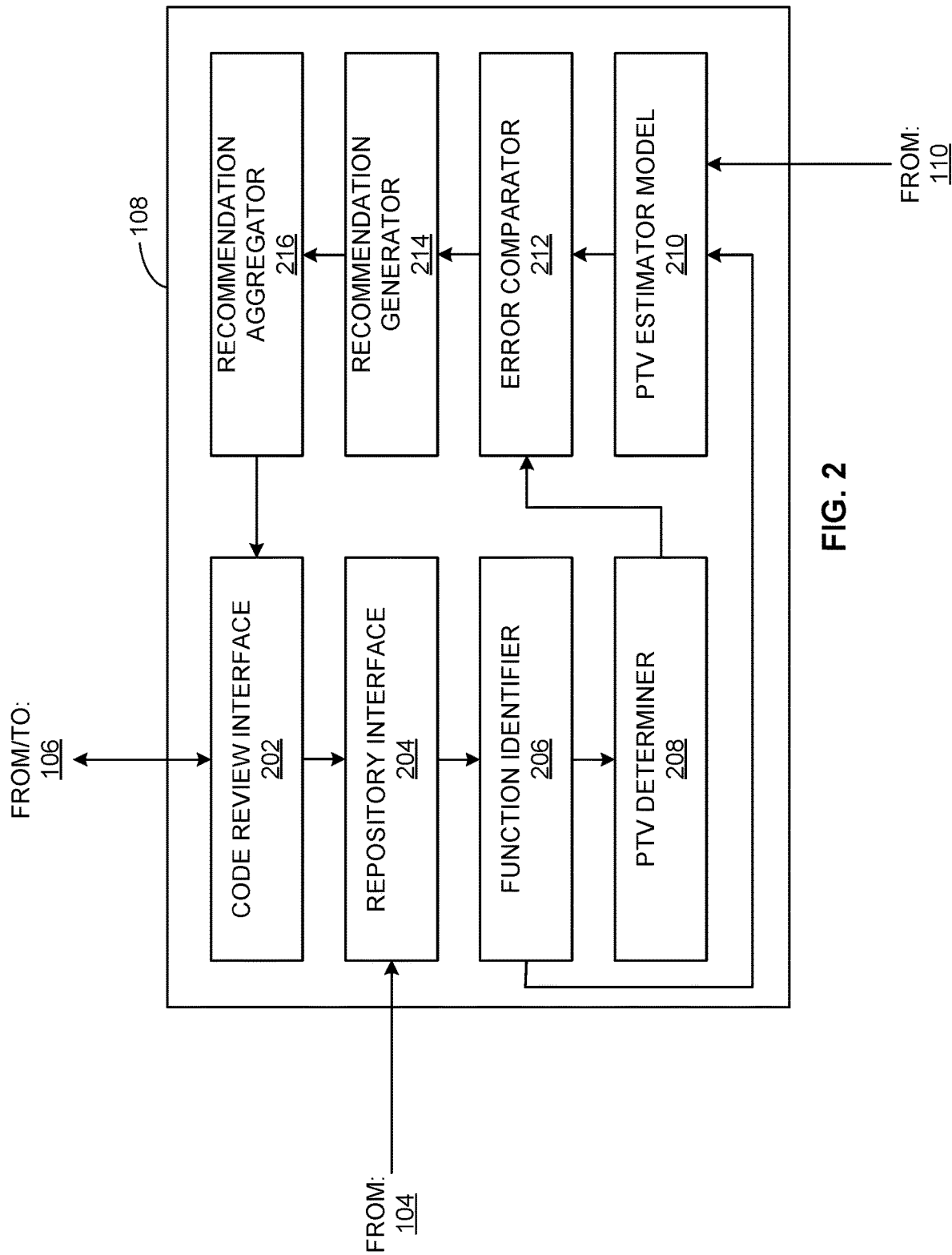
FIG. 2 is a block diagram of a machine programming engine of FIG. 1.

FIG. 2 is a block diagram of the machine programming engine 108 of FIG. 1. The example machine programming engine 108 of FIG. 2 includes an example code review interface 202, an example repository interface 204, an example function identifier 206, an example PTV determiner 208, an example PTV estimator model 210, an example error comparator 212, an example recommendation generator 214, and an example recommendation aggregator 216. In the illustrated example of FIG. 2, the example code review interface 202 is a first transmitting means. In the illustrated example of FIG. 2, the example repository interface 204 is a second transmitting means. In the illustrated example of FIG. 2, the example function identifier 206 is an identifying means. In the illustrated example of FIG. 2, the example PTV determiner 208 is a PTV determining means. In the illustrated example of FIG. 2, the example PTV estimator model 210 is a PTV estimating means. In the illustrated example of FIG. 2, the example error comparator 212 is an error comparing means. In the illustrated example of FIG. 2, an example recommendation generator 214 is a recommendation generating means. In the illustrated example of FIG. 2, an example recommendation aggregator 216 is a recommendation aggregating means. As used herein, the example first transmitting means, the example second transmitting means, the example identifying means, the example PTV determining means, the example PTV estimating means, error comparing means, recommendation generating means and the recommendation aggregating means are hardware.

The example code review interface 202 is an interface that facilitates communication between the code review platform 106 and the machine programming engine 108. For example, the code review interface 202 packages and transmits code review recommendations (e.g., the recommendations 128, recommendations generated by recommendation generator 214 and recommendation aggregator 216, etc.). In some examples, the code review interface 202 can receive review requests (e.g., the review request 124, etc.). In some examples, the code review interface 202 converts received requests into a format readable by the machine programming engine 108. In some examples, the code review interface 202 can be implemented by hardware (e.g., a modem, a direct connection, etc.) and/or software (e.g., an application programming interface, etc.).

The example repository interface 204 is an interface that facilitates communication between the machine programming engine 108 and the repository 104. For example, the repository interface 204 packages and transmits requests for the committed new code 102 and associated metadata. In some examples, the repository interface 204 receives the committed new code 102 and associated metadata. In some examples, the repository interface 204 converts received requests into a format readable by the machine programming engine 108. In some examples, the repository interface 204 can be implemented by hardware (e.g., a modem, a direct connection, etc.) and/or software (e.g., an application programming interface, etc.).

The example function identifier 206 analyzes the new code 102 and identifies the function calls contained therein. For example, the function identifier 206 identifies the function type, input parameters, outputs, arguments, etc. associated with each function of the new code 102. In some examples, the function identifier 206 creates a data structure (e.g., a vector, a matrix, etc.) containing data associated with each identified function and associated parameters. In some examples, the function identifier 206 preprocesses each function identified in the new code 102. For example, the function identifier 206 can normalize, vectorize, etc. each function identified in a way suitable to ensure the PTV estimator model 210 can process the identified function calls.

The example PTV determiner 208 analyzes an identified function to determine the parameter type vector (PTV) associated with each function identified by the function identifier 206. For example, the PTV determiner 208 generates a vector based on the input parameter type(s) of each function of the new code 102. In some examples, the PTV determined by the PTV determiner 208 employs conventional mathematics, operations, and/or lookup tables (e.g., not determined via machine learning, etc.). In some examples, the PTV determined by the PTV determiner 208 is a one-hot encoded vector. An example implementation of the PTV determiner 208 is described in further detail in conjunction with FIG. 2.

The example PTV estimator model 210 is a machine learning algorithm and/or neural network that analyzes each function identified by function identifier 206. As noted above, artificial intelligence (AI), including machine learning (ML), deep learning (DL), and/or other artificial machine-driven logic, enables the example PTV estimator model 210 to analyze each function identified by function identifier 206 to estimate a PTV. For example, the PTV estimator model 210 can be an encoder-decoder LSTM model that is trained and verified using reviewed code from the repository 104. In other examples, the PTV estimator model 210 can be any other suitable type of machine learning network (e.g., an RNN, a gated recurrent unit (GRU), a deep convolutional network (DCN), an echo state network (ESN), a deep residual network (DRN), etc.) In some examples, the PTV estimator model 210 is periodically updated with a delta feed from the repository 104 and/or any other suitable source of data (e.g., the CVE feed 114, etc.). In some examples, the PTV estimator model 210 can be multiple models that are used based on the software type of the new code 102. For example, the PTV estimator model 210 can include a model associated with a first type of code (e.g., operating system software, etc.) and a model associated with a second type of code (e.g., gaming software, etc.). In such examples, the PTV estimator model 210 can be based on the metadata received from the repository 104 via the repository interface 204.

The example error comparator 212 compares the PTV determined by the PTV determiner 208 and the PTV estimated by the PTV estimator model 210 to determine the difference between them. For example, the error comparator 212 determines a reconstruction error based on the comparison. For example, the error comparator 212 can determine the Euclidean distance between PTV determined by the PTV determiner 208 and the PTV estimated by the PTV estimator model 210. In other examples, the error comparator 212 can use any other suitable technique of comparing the determined PTV by the PTV determiner 208 and the PTV estimated by the PTV estimator model 210 (e.g., cosine distance, etc). Additionally or alternatively, the error comparator 212 can compare any other suitable characteristic of the determined PTV and the estimated PTV (e.g., the value of a specific dimension, etc.).

The example recommendation generator 214 generates a review recommendation based on the reconstruction error determined by error comparator 212. For example, the recommendation generator 214 can determine if a function needs to have a review recommendation generated based on if the reconstruction error does not satisfy a reconstruction threshold. In some examples, the reconstruction threshold can be determined based on the reconstruction errors determined during the training of the PTV estimator model 210. In other examples, an operator of the machining learning engine 108 has a tuning parameter to control the frequency of the code review recommendations occurring. In some examples, the recommendation generator 214 does not generate a recommendation if the construction error does satisfy the threshold.

The example recommendation aggregator 216 receives the generated recommendation(s) from the recommendation generator 214. In some examples, the example recommendation aggregator 216 waits for each function of the new code 102 to be analyzed by the PTV determiner 208, the PTV estimator model 210 and/or the error comparator 212. In such examples, the recommendation aggregator 216 transmits a list of functions that require review to the code review platform 106 via the code review interface 202. In other examples, the recommendation aggregator 216 transmits the recommendation(s) to the code review interface as the recommendations are generated.

Figure 4:
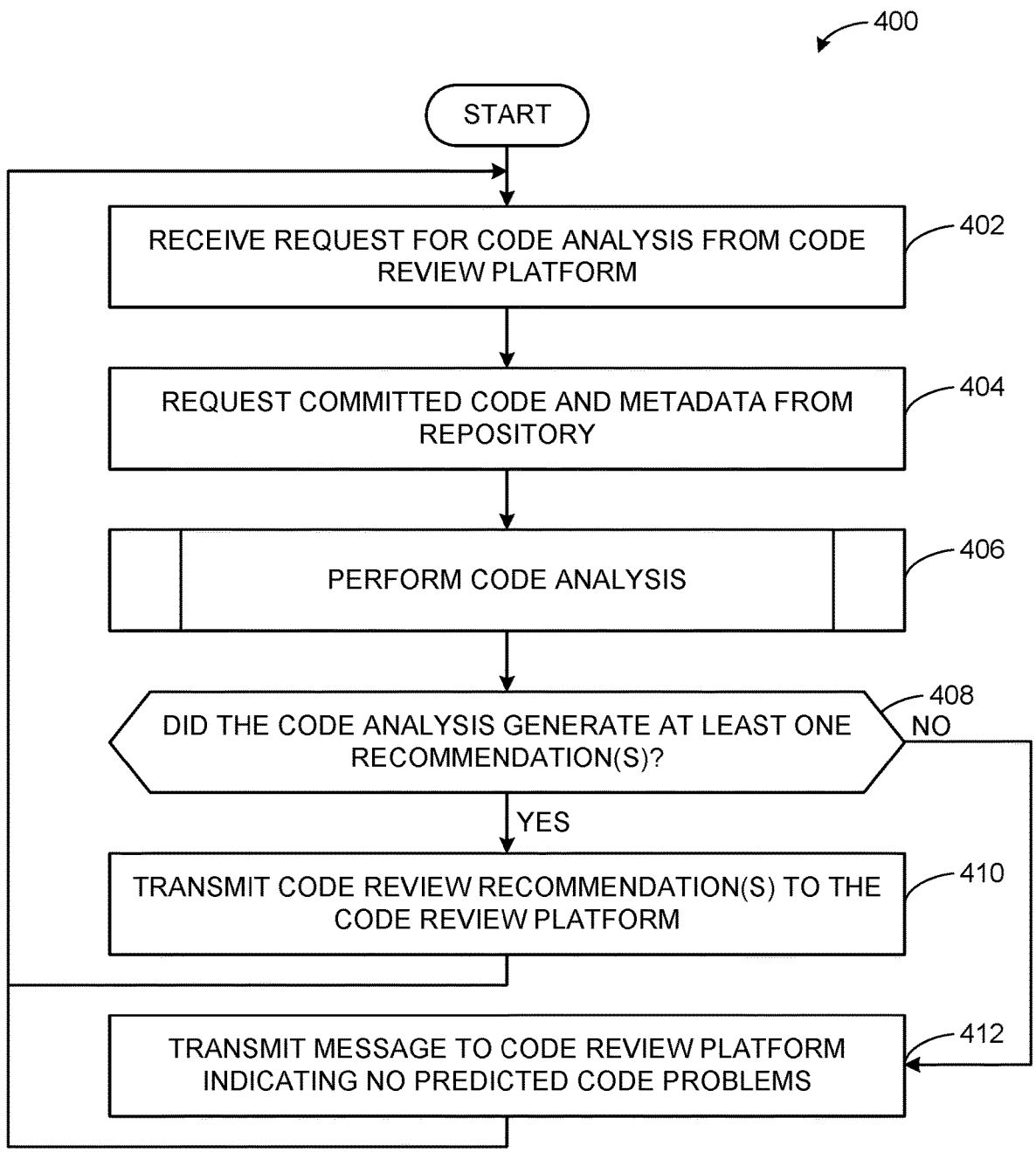
FIGS. 4-6 are flowcharts representative of machine readable instructions which may be executed to implement the machine programming engine of FIGS. 1-2.

While an example manner of implementing the machine programming engine 108 of FIG. 1 is illustrated in FIG. 2, one or more of the elements, processes and/or devices illustrated in FIG. 4 may be combined, divided, re-arranged, omitted, eliminated and/or implemented in any other way. Further, the example code review interface 202, the example repository interface 204, the example function identifier 206, the example PTV determiner 208, the example PTV estimator model 210, the example error comparator 212, the example recommendation generator 214, the example recommendation aggregator 216, and/or, more generally, the example machine programming engine 108 of FIGS. 1 and/or 2 may be implemented by hardware, software, firmware and/or any combination of hardware, software and/or firmware. Thus, for example, any of the example code review interface 202, the example repository interface 204, the example function identifier 206, the example PTV determiner 208, the example PTV estimator model 210, the example error comparator 212, the example recommendation generator 214, the example recommendation aggregator 216, and/or, more generally, the example machine programming engine 108 of FIGS. 1 and/or 2 and/or, more generally, the example machine programming engine 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example code review interface 202, the example repository interface 204, the example function identifier 206, the example PTV determiner 208, the example PTV estimator model 210, the example error comparator 212, the example recommendation generator 214, the example recommendation aggregator 216 is/are hereby expressly defined to include a non-transitory computer readable storage device or storage disk such as a memory, a digital versatile disk (DVD), a compact disk (CD), a Blu-ray disk, etc. including the software and/or firmware. Further still, the example machine programming engine 108 of FIG. 1 may include one or more elements, processes and/or devices in addition to, or instead of, those illustrated in FIGS. 1 and 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
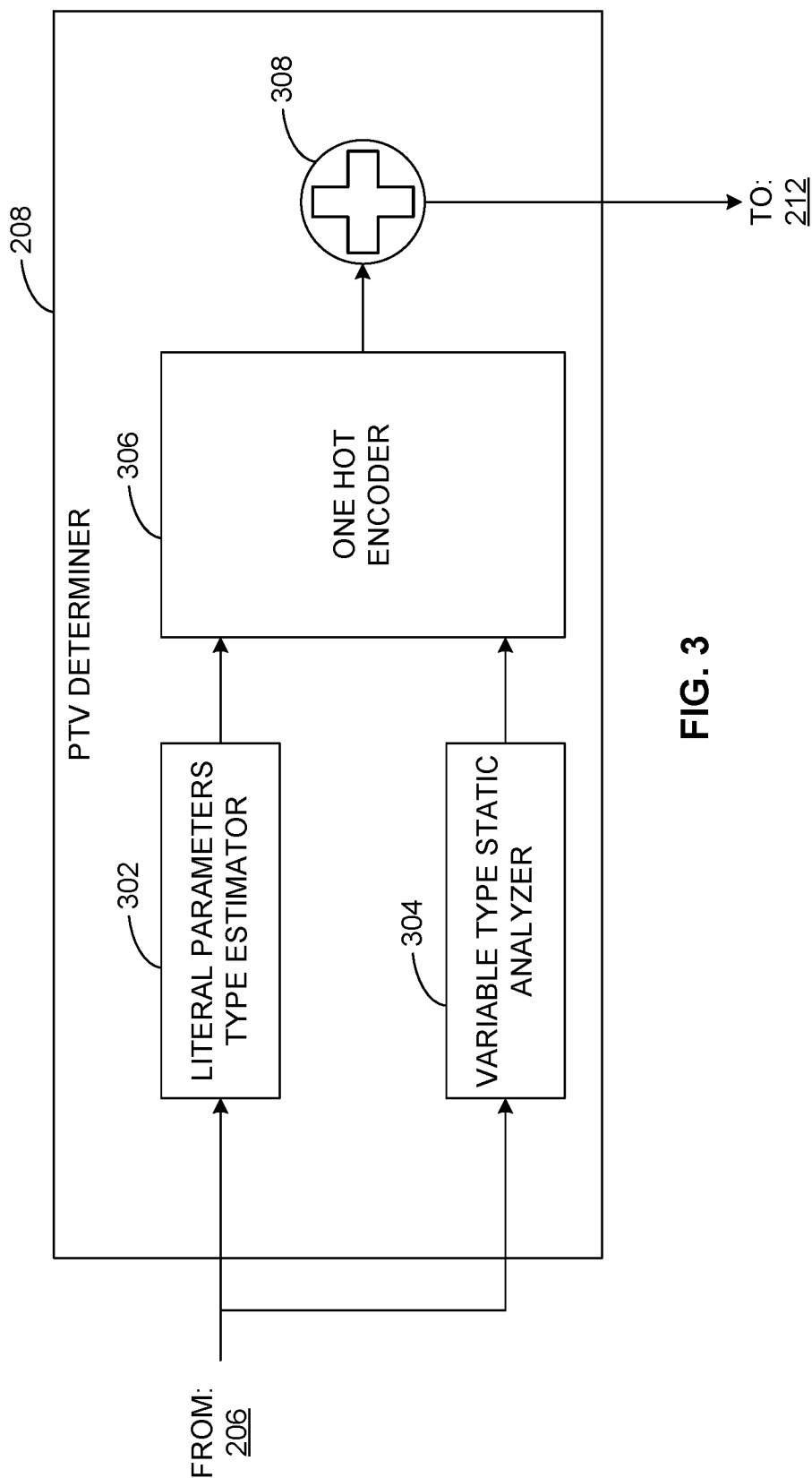
FIG. 3 is a block diagram of the parameter type vector (PTV) determiner of FIG. 2.

FIG. 3 is a block diagram of the example PTV determiner 208 of FIG. 2. The example PTV determiner 208 includes an example literal parameters type estimator 302, an example variable type static analyzer 304, an example one-hot encoder 306, and an example concatenator 308. In the illustrated example of FIG. 3, the example literal parameters type estimator 302 is a literal parameter type estimating means. In the illustrated example of FIG. 3, the example variable type static analyzer 304 is a static variable analyzing means. In the illustrated example of FIG. 3, the example one-hot encoder 306 is an encoding means. In the illustrated example of FIG. 3, the example concatenator 308 is a concatenating means. As used herein, the example literal parameter type estimating means, the example static variable analyzing means, the example encoding means, the example concatenating means are hardware.

The example literal parameter type estimator 302 of FIG. 2 performs literal type detection and embedding for each input of the function of the new code 102. For example, the literal parameter type estimator 302 can analyze each input of each function of the new code 102 to detect if the new input of the function is a literal type object and identify the literal type of the input. As used herein, "literal type" objects are commonly used objects with a fixed value in the programming language of the new code 102. For example, the literal object types can include string, integer, floating point number, Boolean, Unicode, etc. In some examples, the literal parameter type estimator 302 outputs a data structure (e.g., a scalar, a vector, etc.) representative of the identified literal type. In some examples, the literal parameter type estimator 302 outputs a data structure if an input is not a literal type object (e.g., an empty marker, etc.).

The example variable type static analyzer 304 analyzes the function call to determine the primitive data types of inputs. For example, the variable type static analyzer 304 can analyze the log files (e.g., the results of previous function calls, etc.) to determine if the input objects are associated with a primitive data type. As used herein, "primitive type" objects are basic building block objects that include characters, integers, floating point number, Boolean, reference, etc. For example, if a log file of the new code 102 indicates that an input object of a function call is assigned "integer" four times and "character" one time, the example variable type static analyzer 304 determines that the first object is an integer. In other examples, any other method of determining the input variable type can be used by the variable type static analyzer 304. In some examples, the variable type static analyzer 304 outputs a data structure (e.g., a scalar, a vector, etc.) representative of the identified primitive type.

The example one-hot encoder 306 receives the outputs of the literal parameter type estimator 302 and the variable type static analyzer 304 and converts the outputs into a vector. In some examples, the vectors generated by the one-hot encoder 306 are a binary sparse vector in which one dimension (e.g. one index, etc.) has a value of "1" and each of the other dimensions have a value of "0." In some examples, each dimension of the vector represents a different possible data type. For example, if the example variable type static analyzer 304 can identify 10 different data types, each vector generated by the one-hot encoder 306 will be ten dimensions long with each dimension corresponding to a specific data type.

The example concatenator 308 concatenates (e.g., "stacks," appends, etc.) the outputs of the variable type static analyzer 304 and literal parameter type estimator 302 into a PTV. In some examples, to save memory, the concatenator 308 scalarizes each output of the one-hot encoder 306 into a scalar value representing the would-be index of the "1" in the associated sparse vector. In such examples, the PTV can be a scalar value. Additionally or alternatively, the concatenator 308 can create any suitable type of data structure While an example manner of implementing the example PTV determiner 208 of FIG. 2 is illustrated in FIG. 3, one or more of the elements, processes and/or devices illustrated in FIG. 3 may be combined, divided, re-arranged, omitted, eliminated and/or implemented in any other way. Further, the example literal parameters type estimator 302, the example variable type static analyzer 304, the example one-hot encoder 306, the example concatenator 308 and/or, more generally, the example PTV determiner 208 of FIGS. 2 and/or 3 may be implemented by hardware, software, firmware and/or any combination of hardware, software and/or firmware. Thus, for example, any of the example literal parameters type estimator 302, the example variable type static analyzer 304, the example one-hot encoder 306, the example concatenator 308 and/or, more generally, the example PTV determiner 208 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example literal parameters type estimator 302, the example variable type static analyzer 304, the example one-hot encoder 306, the example concatenator 308 is/are hereby expressly defined to include a non-transitory computer readable storage device or storage disk such as a memory, a digital versatile disk (DVD), a compact disk (CD), a Blu-ray disk, etc. including the software and/or firmware. Further still, the example PTV determiner 208 of FIGS. 2 and 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
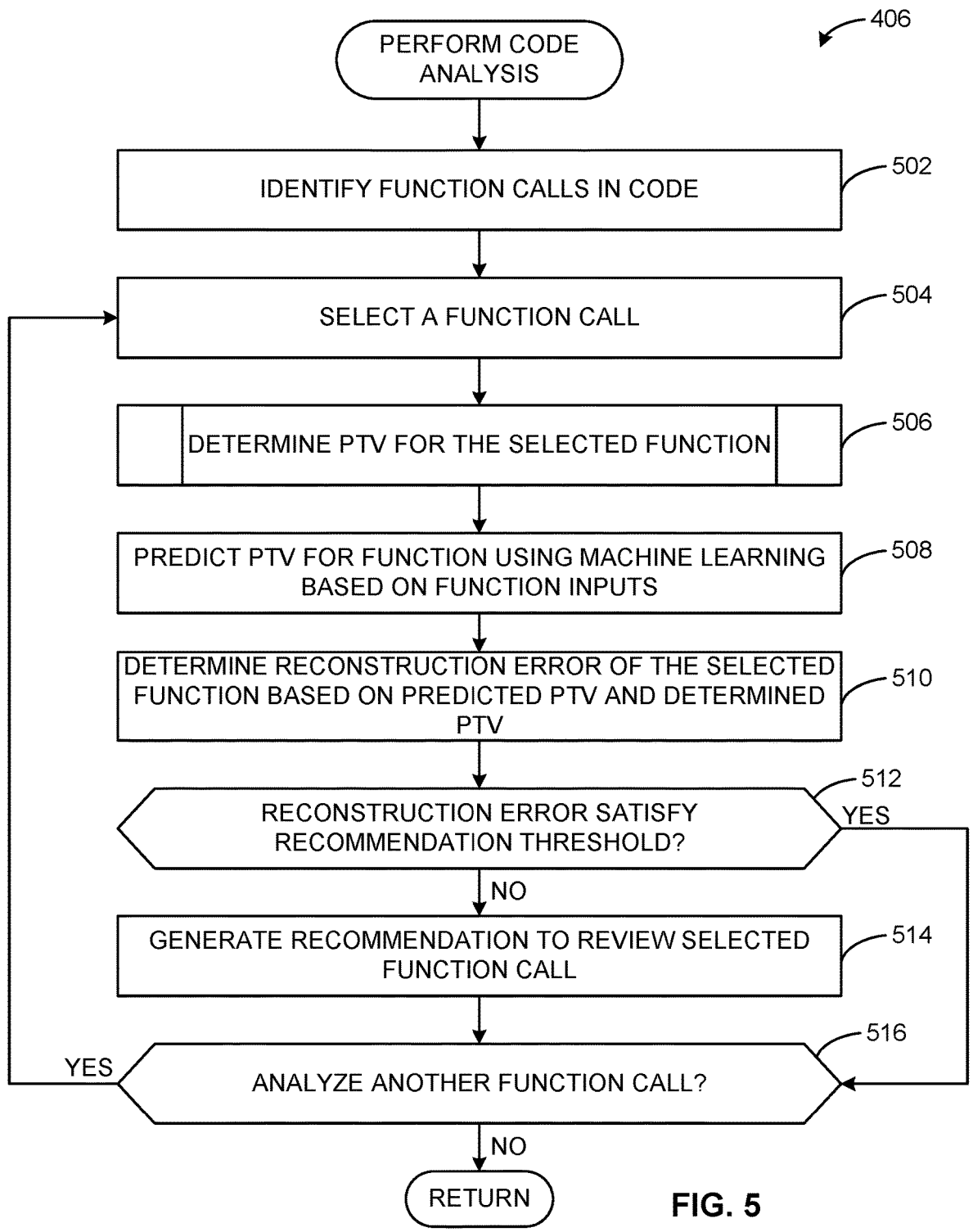
Figure 6:
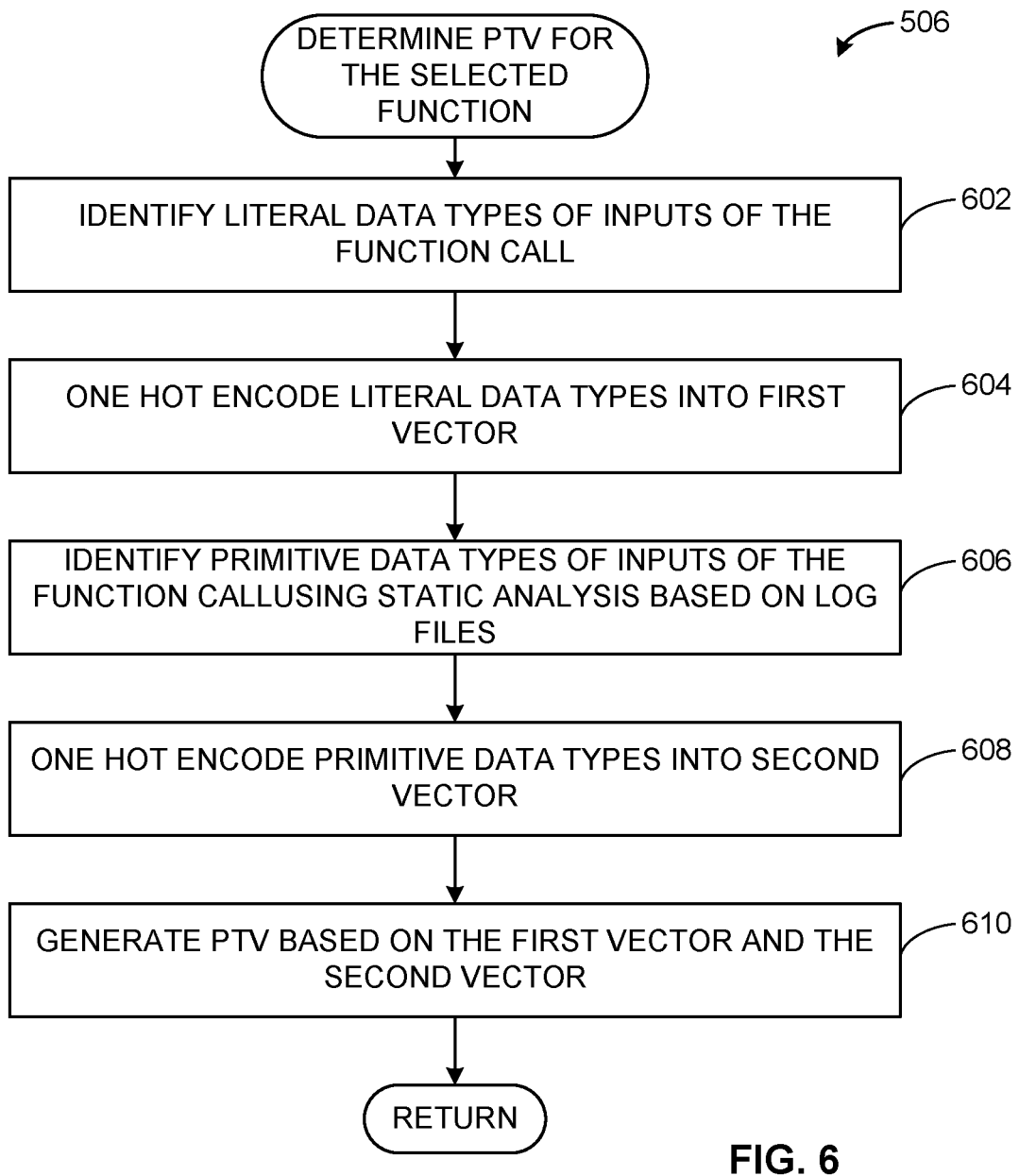

Flowchart representative of example hardware logic, machine readable instructions, hardware implemented state machines, and/or any combination thereof for implementing the machine programming engine 108 of FIGS. 1 and 3 is shown in FIGS. 4-6. The machine readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program(s) and/or parts thereof could alternatively be executed by a device other than the processor 712 and/or embodied in firmware or dedicated hardware. Further, although the example program(s) is/are described with reference to the flowcharts illustrated in FIGS. 4-6, many other methods of implementing the example machine programming engine 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 4-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C. (6) B with C, and (7) A with B and with C. As used herein in the context of describing structures, components, items, objects and/or things, the phrase "at least one of A and B" is intended to refer to implementations including any of (1) at least one A. (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The process 400 of FIG. 4 includes block 402. At block 402, the example code review interface 202 receives a request for code analysis from the code review platform 106. For example, the code review platform 106 can automatically generate a code review request (e.g., the review request 124, etc.) when the new code 102 is committed to the repository 104. In some examples, the request received from the code review interface 202 can include the information required to receive (e.g., the location) of the new code 102 in the repository 104. In some examples, the received request includes information regarding the analysis of the new code 102 (e.g., the tolerance of the construction threshold, the model to be used, etc.).

At block 404, the repository interface 204 requests committed code and metadata from repository 104. For example, the repository interface 204 can transmit a request (e.g., the request 126, etc.) to repository 104 for the code based on the review request 124. In some examples, the repository interface 204 can further request the metadata associated with the new code 102. In other examples, the repository interface 204 can acquire the new code 102 via any other means (e.g., directly input by a developer, from the code review platform 106, etc.).

At block 406, the machine programming engine 108 performs code review analysis. For example, the machine programming engine 108 can determine the what functions of the new code 102 are to be tagged for review. The execution of block 406 is described in greater detail below in conjunction with FIG. 5.

At block 408, the recommendation aggregator 216 determines if the code analysis generate at least one recommendation. For example, the recommendation aggregator 216 can determine if the recommendation generator 214 generated a recommendation during the execution of block 406. If the recommendation aggregator 216 determines that a recommendation was generated, the process 400 advances to block 410. If the recommendation generator 214 determines that no recommendations were generated, the process 400 advances to block 412.

At block 410, the code review interface 202 transmits the generated recommendations to the code review platform 106. For example, the code review interface 202 transmits an annotated version of the code with the functions to be reviewed to the code review platform 106. In some examples, the code review platform 106 transmits a list of the functions to be reviewed to the code review platform 106. In other examples, the code review interface 202 recommendations can be transmitted to code review platform 106 be any other suitable means. The process 400 ends.

At block 412, the code review interface 202 transmits an indication to the code review platform 106 that no recommendations were generated during the code analysis.

The process 500 of FIG. 5 includes block 502. At block 502, the function identifier 206 identifies the function calls in the new code 102. For example, the function identifier can parse the new code 102 to determine the function calls contained therein. In some examples, the function identifier 206 can identify other parameters (e.g., the input objects, etc.) associated with the functions of the new code 102.

At block 504, the function identifier 206 selects a function call. For example, the function identifier 206 can select a function call identified during the execution of block 502. In some examples, during the first execution of block 504, the function identifier 206 selects the first function of the new code 102 and iterates as the machine programming engine analyzes the new code 102 (e.g., the second function is analyzed second, the third function is analyzed third, etc.). In such examples, the order selected by the function identifier 206 enables the use of an order dependent PTV estimator model 210 (e.g., a general RNN, an LSTM, etc.). In other examples, the function identifier 206 can select functions in any suitable order (e.g., randomly, reverse order, etc.).

At block 506, the PTV determiner 208 determines the PTV for the selected function. For example, the PTV determiner 208 can analyze the inputs of the selected function to determine the PTV of the function. The execution of block 506 is described in greater detail in conjunction with FIG. 6.

At block 508, the PTV estimator model 210 analyzes the function to predict a PTV of the function. For example, the PTV estimator model 210 analyzes the function using a neural network (e.g., a general RNN, an LSTM, etc.) to generate a PTV. In some examples, the PTV estimator model 210 is trained via a bank of reviewed source code (e.g. from the repository 104. In such examples, the functions of the reviewed source code acts as a training input from the PTV estimator model 210 and the corresponding PTVs are used as the training output. In some examples, the corresponding PTVs of the reviewed source code can be determined via the PTV determiner 208. In some examples, the PTVs of the functions of the new code 102 can be predicted via the topology of the PTV estimator model 210.

At block 510, the error comparator 212 determines the reconstruction error of the selected function based on the predicted PTV and the determined PTV. For example, the error comparator 212 can calculate the Euclidean distance between the predicted PTV (e.g., as determined by the PTV estimator model 210 at block 508, etc.) and the PTV determiner 208 (e.g., as determined by the PTV determiner 208 at block 506, etc.). In other examples, the error comparator 212 can use any other suitable means to determine the reconstruction error.

At block 512, the recommendation generator 214 determines if the reconstruction error satisfies the recommendation threshold. In some examples, the recommendation threshold is determined empirically during the training of the PTV estimator model 210. In some examples, the recommendation threshold can be set when the request is sent to the machine programming engine 108. In other examples, the recommendation threshold can be determined by any other suitable means. If the recommendation generator 214 determines the reconstruction error satisfies the recommendation threshold, the process 500 advances to the block 512. If the recommendation generator 214 determines the reconstruction error does not satisfy the recommendation threshold, the process 500 advances to the block 514.

At block 514, the recommendation generator 214 generates a recommendation to review the selected function call. For example, the recommendation generator 214 could tag the function call for review. In some examples, the recommendation generator 214 can generate a specific suggestion for review. In some examples, the recommendation generator 214 can add the function call to a list of function calls for review.

At block 516, the function identifier 206 determines if another function call is to be analyzed. For example, the function identifier 206 can determine if there are function calls in the new code 102 that have yet to be analyzed. In other examples, the function identifier 206 can use any other suitable means of determining if another function call is to be analyzed. If another function call is to be analyzed, the process 500 returns to block 504. If another function call is not be analyzed, the process 500 ends.

The process 600 of FIG. 6 includes block 602. At block 602, the literal parameter type estimator 302 identifies literal data types of inputs of the function call. For example, the literal parameter type estimator 302 can identify the literal type(s) (e.g., string, floating point number, integer, etc.) associated with each function call. In some examples, the literal parameter type estimator 302 can determine the literal type parameters of the input of the function call by analyzing the new code 102. In other examples, the literal parameter type estimator 302 can determine the literal data type via any other suitable means (e.g., prompting the developer for manual input, metadata, etc.).

At block 604, the one-hot encoder 306 one hot encodes the literal data types into a first vector. For example, the one-hot encoder 306 can generate a data structure (e.g., a sparse binary vector, etc.) in which one dimension (e.g., one index, etc.) has a value of "1" and each of the other dimensions have a value of "0." In such examples, each dimension of the data structure represents a different possible literal data type of the function call. For example, if there are ten possible literal data types of the function input, the one-hot encoder 306 creates a data structure with ten dimensions with each dimension corresponding to one of the specific literal data types.

At block 606, the variable type static analyzer 304 identifies primitive data types of the function calls using static analysis based on log files. For example, the variable type static analyzer 304 can analyze the log files of the function to determine what data type(s) was assigned to the function inputs. For example, if a function input was assigned as a string four times and an integer one time, the variable type static analyzer 304 identifies the At block 608, the one-hot encoder 306 one hot encodes the primitive data types into a second vector. For example, the one-hot encoder 306 can generate a data structure (e.g., a sparse binary vector, etc.) in which one dimension (e.g., one index, etc.) has a value of "1" and each of the other dimensions are "0." In such examples, each dimensions of the data structure represents a different possible primitive data type(s) of the function call. For example, if there are ten possible primitive data type(s) of the function input, the one-hot encoder 306 creates a data structure with ten dimensions with each dimension corresponding to one of the specific primitive data type(s).

At block 610, the concatenator 308 generates a PTV based on the first vector and the second vector. For example, the concatenator 308 can combine the data structure generated by the one-hot encoder 306 during the execution of the block 604 and the data structure generated by the one-hot encoder 306 during the execution of the block 608. In some examples, the concatenator 308 concatenates the data structure(s). The process 600 ends.

Figure 7:
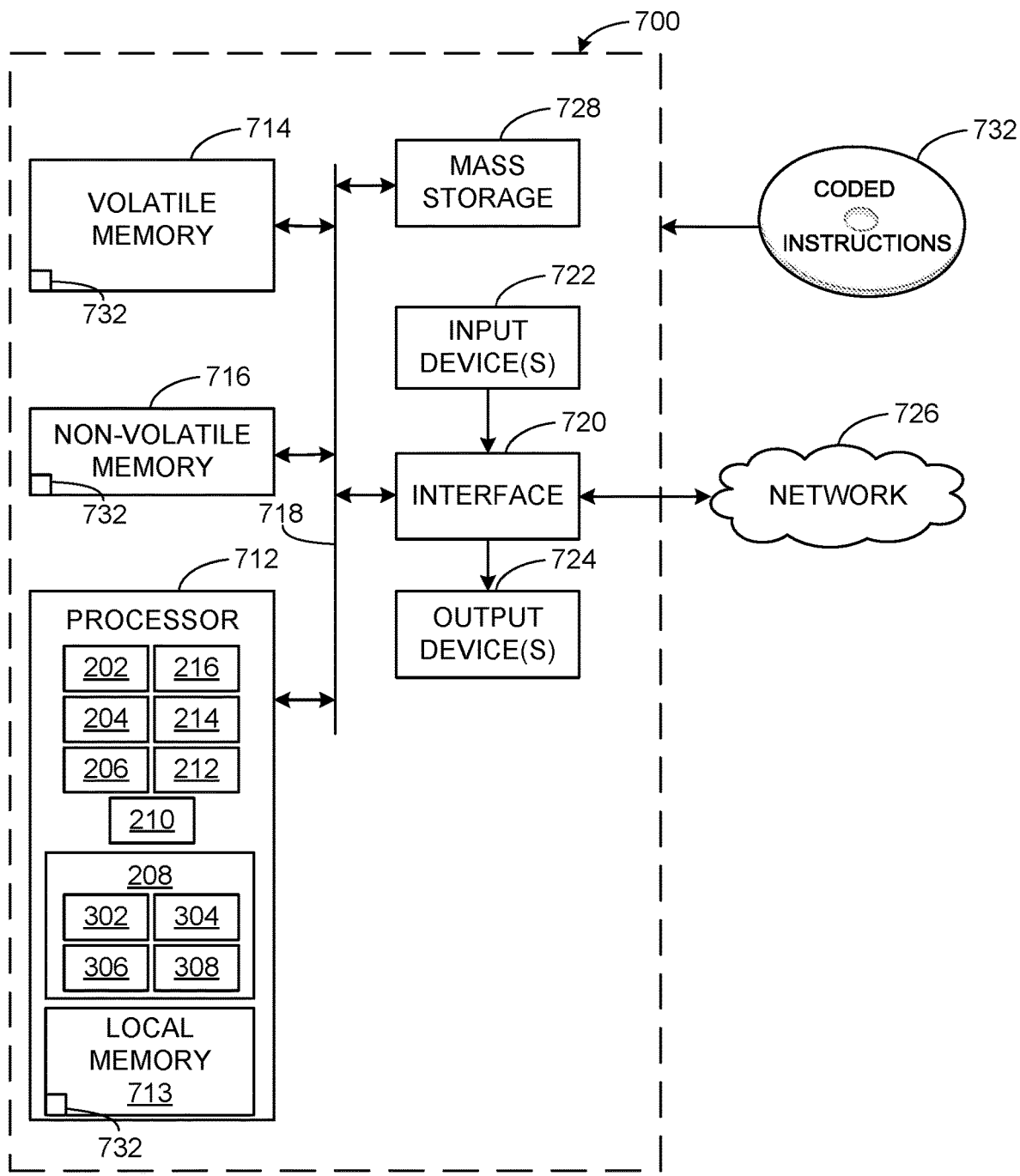
FIG. 7 is a block diagram of an example processing platform structured to execute the instructions of FIGS. 4-6 to implement the machine programming engine of FIGS. 1 and/or 2.

FIG. 7 is a block diagram of an example processor platform 700 structured to execute the instructions of FIGS. 4-6 to implement the machine programming engine 108 of FIGS. 1-3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 700 of the illustrated example includes a processor 712. The processor 1012 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example function identifier 206, the example PTV determiner 208, the example PTV estimator model 210, the example error comparator 212, the example recommendation generatorz, and the example recommendation aggregator 216.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM). Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input jdevice(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 4-6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that provide code review assistance for dynamically typed languages. The disclosed methods, apparatus and articles of manufacture improve the efficiency of using a computing device by reducing the amount of time associated with reviewing and correcting dynamically typed languages. The disclosed methods, apparatus and articles of manufacture are accordingly directed to one or more improvement(s) in the functioning of a computer.

Example methods, apparatus, systems, and articles of manufacture for code review assistance for dynamically typed languages are disclosed herein. Further examples and combinations thereof include the following: Example 1 includes an apparatus to analyze a segment of code, the apparatus comprising a function identifier to identify a first input of a first function call included in the segment of the code, a parameter type vector (PTV) estimator model to estimate a first data structure based on the first input, the PTV estimator model generated via a set of reviewed code, a PTV determiner to generate a second data structure based on a data parameter type of the first input, an error comparator to determine a first reconstruction error based on the first data structure and the second data structure, and a recommendation generator to, if the first reconstruction error does not satisfy a recommendation threshold, generate a first recommendation to review the first function call.

Example 2 includes the apparatus of example 1, wherein the function identifier is to identify a second input of a second function call included in the segment of the code, the second function call after the first function call in the segment of the code, the PTV estimator model is to estimate a third data structure based on the first input and the second input, the PTV determiner is to calculate a fourth data structure based on the data parameter type of the second input, the error comparator is to determine a second reconstruction error based on the third data structure and the fourth data structure, and the recommendation generator is to, if the second reconstruction error does not satisfy the second recommendation threshold, generate a second recommendation to review the second function call.

Example 3 includes the apparatus of example 2, wherein the PTV estimator model is further to estimate the first data structure based on the second input.

Example 4 includes the apparatus of example 1, wherein the PTV estimator model is an encoder-decoder LSTM.

Example 5 includes the apparatus example 1, wherein the PTV determiner includes a literal parameter type estimator to determine a literal type associated with the first input, a variable type static analyzer to determine, by analyzing a log file associated with the segment of the code, a primitive type associated with the first input, and a concatenator to generate the first data structure based on at least one of the determined literal type or the primitive type.

Example 6 includes the apparatus of example 1, wherein the error comparator is to determine the first reconstruction error based on an Euclidean distance between the first data structure and the second data structure.

Example 7 includes the apparatus of example 1, wherein the set of reviewed code is queried and normalized from an online repository.

Example 8 includes a method to analyze a segment of code, the method comprising identifying, by executing an instruction with at least one processor, a first input of a first function call included in the segment of the code, estimating, by executing an instruction with the at least one processor via a neural network, a first data structure based on the first input, the neural network generated via a set of reviewed code, generating, by executing an instruction with the at least one processor, a second data structure based on a data parameter type of the first input, determining, by executing an instruction with the at least one processor, a first reconstruction error based on the first data structure and the second data structure, and if the first reconstruction error does not satisfy a recommendation threshold, generating, by executing an instruction with the at least one processor, a first recommendation to review the first function call.

Example 9 includes the method of example 8, further including identifying a second input of a second function call included in the segment of the code, the second function call after the first function call in the segment of the code, estimating, via the neural network, a third data structure based on the first input and the second input calculating a fourth data structure based on the data parameter type of the second input, determining a second reconstruction error based on the third data structure and the fourth structure, and if the second reconstruction error does not satisfy a recommendation threshold, generating a second recommendation to review the second function call.

Example 10 includes the method of example 9, wherein the estimating, via the neural network, the first data structure is further based on the second input.

Example 11 includes the method of example 8, wherein the neural network is an encoder-decoder LSTM.

Example 12 includes the method of example 8, wherein the calculating a second data structure based on the data parameter type of the first input includes determining a literal type associated with the first input, determining, by analyzing a log file associated with the segment of the code, a primitive type associated with the first input, and generating the first data structure based on at least one of the determined literal type or the primitive type.

Example 13 includes the method of example 8, wherein the determining a first reconstruction error based on the first data structure and the second structure includes determining an Euclidean distance between the first data structure and the second data structure.

Example 14 includes the method of example 8, wherein the set of reviewed code is queried and normalized from an online repository.

Example 15 includes a non-transitory computer readable storage medium which, when executed, cause a machine to at least identify a first input of a first function call included in the segment of the code, estimate, via a neural network, a first data structure based on the first input, the neural network generated via a set of reviewed code, generate a second data structure based on a data parameter type of the first input, determine a first reconstruction error based on the first data structure and the second data structure, and if the first reconstruction error does not satisfy a recommendation threshold, generate a first recommendation to review the first function call.

Example 16 includes the non-transitory computer readable storage medium of example 15, wherein the instructions cause the machine further to identify a second input of a second function call included in the segment of the code, the second function call after the first function call in the segment of the code, estimate, via the neural network, a third data structure based on the first input and the second input calculate a fourth data structure based on the data parameter type of the second input, determine a second reconstruction error based on the third data structure and the fourth structure, and if the second reconstruction error does not satisfy a recommendation threshold, generate a second recommendation to review the second function call.

Example 17 includes the non-transitory computer readable storage medium of example 16, the first data structure is further based on the second input.

Example 18 includes the non-transitory computer readable storage medium of example 15, wherein the neural network is an encoder-decoder LSTM.

Example 19 includes the non-transitory computer readable storage medium of example 15, wherein the instructions cause the machine to calculate a second data structure based on the data parameter type of the first input by determining a literal type associated with the first input, determining, by analyzing a log file associated with the segment of the code, a primitive type associated with the first input, and generating the first data structure based on at least one of the determined literal type or the primitive type.

Example 20 includes the non-transitory computer readable storage medium of example 15, wherein the first reconstruction error is on an Euclidean distance between the first data structure and the second data structure. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to analyze function calls included in a segment of code, the apparatus comprising:
    a logic circuit;
    a code review interface to request, via a network, the code and metadata associated with the segment of the code from an online code repository;
    a function identifier to identify the function calls in the segment of the code, select a first function call included in the segment of the code for analysis, and identify a first input of the selected first function call;
    a model generator to generate a parameter type vector (PTV) estimator model via machine learning, wherein the PTV estimator model is trained via a set of reviewed code, wherein the PTV estimator model is to estimate a first data structure corresponding to the selected first function call, and wherein the estimation of the first data structure is based on the first input of the selected first function call;
    a literal parameter type estimator to determine a literal type associated with the first input of the selected first function call;
    a concatenator to generate a second data structure corresponding to the selected first function call based on the determined literal type associated with the first input of the selected first function call;
    an error comparator to determine a first reconstruction error of the selected first function call based on a comparison between the first data structure corresponding to the selected first function call and the second data structure corresponding to the selected first function call;
    a recommendation generator to, if the first reconstruction error of the selected first function call does not satisfy a recommendation threshold, generate a first recommendation to review the selected first function call; and
    a recommendation aggregator to, if the first recommendation is generated, transmit the first recommendation to a code review platform to perform review of the selected first function call, wherein the logic circuit is to implement at least one of the code review interface, the function identifier, the model generator, the literal parameter type estimator, the concatenator, the error comparator, the recommendation generator, or the recommendation aggregator.

2. The apparatus of claim 1, wherein:
    the function identifier is to select a second function call included in the segment of the code for analysis and identify a second input of the selected second function call, wherein the selected second function call occurs after the selected first function call in the segment of the code;
    the PTV estimator model is to estimate a third data structure corresponding to the selected second function call, wherein the estimation of the third data structure is based on the first input of the selected first function call and the second input of the selected second function call;
    the concatenator is to generate a fourth data structure corresponding to the selected second function call based on a data parameter type of the second input of the selected second function call;

the error comparator is to determine a second reconstruction error of the selected second function call based on a comparison between the third data structure corresponding to the selected second function call and the fourth data structure corresponding to the selected second function call; and the recommendation generator is to, if the second reconstruction error of the selected second function call does not satisfy the recommendation threshold, generate a second recommendation to review the selected second function call.

3. The apparatus of claim 2, wherein the PTV estimator model is to estimate the first data structure corresponding to the selected first function call, and wherein the estimation of the first data structure is further based on the second input of the selected second function call.

4. The apparatus of claim 1, wherein the PTV estimator model is an encoder-decoder long short-term memory (LSTM).

5. The apparatus of claim 1, further including a variable type static analyzer to determine, by analyzing a log file associated with the segment of the code, a primitive type associated with the first input of the selected first function call, wherein the concatenator is to generate the second data structure corresponding to the selected first function call further based on the determined primitive type associated with the first input of the selected first function call.

6. The apparatus of claim 1, wherein the error comparator is to determine the first reconstruction error of the selected first function call based on a Euclidean distance between the first data structure corresponding to the selected first function call and the second data structure corresponding to the selected first function call.

7. The apparatus of claim 1, wherein the set of reviewed code is queried and normalized from the online code repository.

8. A method to analyze function calls included in a segment of code, the method comprising:
requesting, by executing an instruction with at least one processor, via a network, the code and metadata associated with the segment of the code from an online code repository;
identifying, by executing an instruction with the at least one processor, the function calls in the segment of the code;
selecting, by executing an instruction with the at least one processor, a first function call included in the segment of the code for analysis;
identifying, by executing an instruction with the at least one processor, a first input of the selected first function call;
estimating, by executing an instruction with the at least one processor, via a neural network, a first data structure corresponding to the selected first function call, wherein the estimation of the first data structure is based on the first input of the selected first function call, and wherein the neural network is trained via a set of reviewed code;
determining, by executing an instruction with the at least one processor, a literal type associated with the first input of the selected first function call;
generating, by executing an instruction with the at least one processor, a second data structure corresponding to the selected first function call based on the determined literal type associated with the first input of the selected first function call;
determining, by executing an instruction with the at least one processor, a first reconstruction error of the selected first function call based on a comparison between the first data structure corresponding to the selected first function call and the second data structure corresponding to the selected first function call; and
if the first reconstruction error of the selected first function call does not satisfy a recommendation threshold:
generating, by executing an instruction with the at least one processor, a first recommendation to review the selected first function call; and
transmitting, by executing an instruction with the at least one processor, the first recommendation to a code review platform to perform review of the selected first function call.

9. The method of claim 8, further including:
selecting a second function call included in the segment of the code for analysis and identifying a second input of the selected second function call, wherein the selected second function call occurs after the selected first function call in the segment of the code;
estimating, via the neural network, a third data structure corresponding to the selected second function call, wherein the estimation of the third data structure is based on the first input of the selected first function call and the second input of the selected second function call;
generating a fourth data structure corresponding to the selected second function call based on a data parameter type of the second input of the selected second function call;
determining a second reconstruction error of the selected second function call based on a comparison between the third data structure corresponding to the selected second function call and the fourth data structure corresponding to the selected second function call; and
if the second reconstruction error of the selected second function call does not satisfy the recommendation threshold, generating a second recommendation to review the selected second function call.

10. The method of claim 9, wherein the estimating, via the neural network, of the first data structure corresponding to the selected first function call is further based on the second input of the selected second function call.

11. The method of claim 8, wherein the neural network is an encoder-decoder long short-term memory (LSTM).

12. The method of claim 8, further including determining, by analyzing a log file associated with the segment of the code, a primitive type associated with the first input of the selected first function call, and generating the second data structure corresponding to the selected first function call further based on the determined primitive type associated with the first input of the selected first function call.

13. The method of claim 8, wherein the determining the first reconstruction error of the selected first function call is based on a Euclidean distance between the first data structure corresponding to the selected first function call and the second data structure corresponding to the selected first function call.

14. The method of claim 8, wherein the set of reviewed code is queried and normalized from the online code repository.

15. A non-transitory computer readable medium comprising instructions stored thereon which, when executed, cause a machine to at least:
  request, via a network, code and metadata associated with a segment of the code from an online code repository;
  identify function calls in the segment of the code;
  select a first function call included in the segment of the code for analysis;
  identify a first input of the selected first function call;
  estimate, via a neural network, a first data structure corresponding to the selected first function call, wherein the estimation of the first data structure is based on the first input of the selected first function call, and wherein the neural network is trained via a set of reviewed code;
  determine a literal type associated with the first input of the selected first function call;
  generate a second data structure corresponding to the selected first function call based on the determined literal type associated with the first input of the selected first function call;
  determine a first reconstruction error of the selected first function call based on a comparison between the first data structure corresponding to the selected first function call and the second data structure corresponding to the selected first function call; and
  if the first reconstruction error of the selected first function call does not satisfy a recommendation threshold:
    generate a first recommendation to review the selected first function call; and
    transmit the first recommendation to a code review platform to perform review of the selected first function call.

16. The non-transitory computer readable medium of claim 15, wherein the instructions which, when executed, cause the machine further to:
  select a second function call included in the segment of the code for analysis and identify a second input of the selected second function call, wherein the selected second function call occurs after the selected first function call in the segment of the code;
  estimate, via the neural network, a third data structure corresponding to the selected second function call, wherein the estimation of the third data structure is based on the first input of the selected first function call and the second input of the selected second function call;
  generate a fourth data structure corresponding to the selected second function call based on a data parameter type of the second input of the selected second function call;
  determine a second reconstruction error of the selected second function call based on a comparison between the third data structure corresponding to the selected second function call and the fourth data structure corresponding to the selected second function call; and
  if the second reconstruction error of the selected second function call does not satisfy the recommendation threshold, generate a second recommendation to review the selected second function call.

17. The non-transitory computer readable medium of claim 16, wherein the estimating, via the neural network, of the first data structure corresponding to the selected first function call is further based on the second input of the selected second function call.

18. The non-transitory computer readable medium of claim 15, wherein the neural network is an encoder-decoder long short-term memory (LSTM).

19. The non-transitory computer readable medium of claim 15, wherein the instructions which, when executed, cause the machine further to determine, by analyzing a log file associated with the segment of the code, a primitive type associated with the first input of the selected first function call, and generating the second data structure corresponding to the selected first function call further based on the determined primitive type associated with the first input of the selected first function call.

20. The non-transitory computer readable medium of claim 15, wherein the determining the first reconstruction error of the selected first function call is based on a Euclidean distance between the first data structure corresponding to the selected first function call and the second data structure corresponding to the selected first function call.

21. An apparatus comprising:
  at least one memory;
  instructions; and
  at least one processor to execute the instructions to:
    request, via a network, code and metadata associated with a segment of the code from an online code repository;
    identify function calls in the segment of the code;
    select a first function call included in the segment of the code for analysis;
    identify a first input of the selected first function call;
    estimate, via a neural network, a first data structure corresponding to the selected first function call, wherein the estimation of the first data structure is based on the first input of the selected first function call, and wherein the neural network is trained via a set of reviewed code;
    determine a literal type associated with the first input of the selected first function call;
    generate a second data structure corresponding to the selected first function call based on the determined literal type associated with the first input of the selected first function call;
    determine a first reconstruction error of the selected first function call based on a comparison between the first data structure corresponding to the selected first function call and the second data structure corresponding to the selected first function call; and
    if the first reconstruction error of the selected first function call does not satisfy a recommendation threshold:
      generate a first recommendation to review the selected first function call; and
      transmit the first recommendation to a code review platform to perform review of the selected first function call.

22. The apparatus of claim 21, wherein the at least one processor executes the instructions further to:
  select a second function call included in the segment of the code for analysis and identify a second input of the selected second function call, wherein the selected second function call occurs after the selected first function call in the segment of the code;
  estimate, via the neural network, a third data structure corresponding to the selected second function call, wherein the estimation of the third data structure is based on the first input of the selected first function call and the second input of the selected second function call;

generate a fourth data structure corresponding to the selected second function call based on a data parameter type of the second input of the selected second function call;

determine a second reconstruction error of the selected second function call based on a comparison between the third data structure corresponding to the selected second function call and the fourth data structure corresponding to the selected second function call; and if the second reconstruction error of the selected second function call does not satisfy the recommendation threshold, generate a second recommendation to review the selected second function call.

23. The apparatus of claim 22, wherein the at least one processor executes the instructions to estimate, via the neural network, of the first data structure corresponding to the selected first function call is further based on the second input of the selected second function call.

24. The apparatus of claim 22, wherein the neural network is an encoder-decoder long short-term memory (LSTM).

25. The apparatus of claim 22, wherein the at least one processor executes the instructions further to determine, by analyzing a log file associated with the segment of the code, a primitive type associated with the first input of the selected first function call, and generating the second data structure corresponding to the selected first function call further based on the determined primitive type associated with the first input of the selected first function call.

26. The apparatus of claim 22, wherein the at least one processor executes the instructions to determine the first reconstruction error of the selected first function call based on a Euclidean distance between the first data structure corresponding to the selected first function call and the second data structure corresponding to the selected first function call.

* * * * *